(12) United States Patent
Yamaguchi et al.

(10) Patent No.: US 6,180,741 B1
(45) Date of Patent: Jan. 30, 2001

(54) LIQUID CURABLE RESIN COMPOSITION

(75) Inventors: Yoshikazu Yamaguchi; Zen Komiya, both of Tsukuba; Takashi Ukachi, Ushiku, all of (JP)

(73) Assignees: DSM N.V., Heerlen (NL); JSR Corporation, Chuo-ku (JP)

( * ) Notice: Under 35 U.S.C. 154(b), the term of this patent shall be extended for 0 days.

(21) Appl. No.: 09/413,883

(22) Filed: Oct. 7, 1999

Related U.S. Application Data

(63) Continuation of application No. PCT/NL98/00208, filed on Apr. 10, 1998.

(30) Foreign Application Priority Data

Apr. 14, 1997 (JP) .................................................... 9-095686

(51) Int. Cl.[7] ................................................. C08G 77/458
(52) U.S. Cl. ............................. 526/301; 522/90; 522/96; 522/97; 427/508; 427/515; 427/516; 385/123; 528/32; 528/25; 525/477; 525/479
(58) Field of Search ............................... 526/301; 522/90, 522/96, 97; 427/508, 515, 516; 385/123; 528/32; 525/477, 479

(56) References Cited

U.S. PATENT DOCUMENTS 4,543,398 * 9/1985 Bany et al. .

5,650,231 * 7/1997 Barraud et al. .

FOREIGN PATENT DOCUMENTS 407 004 * 1/1991 (EP) .
780 712 * 6/1997 (EP) .
97/38035 * 10/1997 (WO) .

* cited by examiner

*Primary Examiner*—Robert Dawson
*Assistant Examiner*—Kuo-Liang Peng
(74) *Attorney, Agent, or Firm*—Pillsbury Madison & Sutro

(57) ABSTRACT

A liquid curable resin composition exhibiting superior storing stability and suitable for use as a material for optical fiber ribbon matrix, a bundling material, and a material for up-jacketing fibers. The composition contains a first polydimethylsiloxane compound which contains (i) at least two urethane bonds, (ii) an unreactive organic group attached to at least one end of the first polydimethyl-siloxane, and (iii) a (meth)acrylol group attached to at least one end of the first polydimethylsiloxane, and a second polydimethylsiloxane compound which contains (i) at least two urethane bonds and (ii) an unreactive organic group attached to at least one end of the second polydimethylsiloxane, and optionally a third polysiloxane compound which does not contain urethane bonds.

19 Claims, No Drawings

LIQUID CURABLE RESIN COMPOSITION

This is a Continuation of International Appln. No. PCT/NL98/00208 filed Apr. 10, 1998.

FIELD OF THE INVENTION

The present invention relates to a liquid curable resin composition producing cured products with excellent surface slipperiness, and more particularly, to a liquid curable resin composition suitable for use as a coating material for optical fiber ribbon matrix, up-jacketing fiber, and the like.

DESCRIPTION OF THE BACKGROUND ART

In the production of optical fibers, a resin coating is provided for protection and reinforcement immediately after spinning a molten glass fiber. A known structure of the resin coating consists of a primary coating layer of a flexible resin which is coated on the surface of optical fibers and a secondary coating layer of a rigid resin which is provided over the primary coating layer. A so-called optical fiber ribbon is known in the art in the application of optical fibers provided with a resin coating. The optical fiber ribbon is made from several elemental optical fibers, e.g. four or eight optical fibers, by arranging these fibers in a plane and fixing them with a binder to produce a ribbon structure with a rectangular cross section. The binder for preparing the optical fiber ribbon from several optical fibers is called a ribbon matrix material. A multiple core ribbon structure consisting of several optical fiber ribbons is also known. The material for binding the optical fiber ribbons is called a bundling material.

An up-jacketing fiber with a thick coating layer provided over colored optical fiber is also known. The resin composition for producing such a thick coating layer is called an up-jacketing material.

The characteristics required for curable resins used as the coating materials for optical fibers include: a liquid at room temperature with a sufficiently low viscosity to be excellently coated; superior shelf life maintaining even composition distribution; good productivity at a high curing rate; sufficient strength and superior flexibility; very little physical change during temperature change over a wide range; superior heat resistance and superior resistance to hydrolysis; superior long term reliability with little physical change over time; superior resistance to chemicals such as acids and alkalis; low moisture and water absorption; superior light resistance; high resistance to oils; little hydrogen gas generation which adversely affects optical fiber characteristics; production of cured products with slippery surfaces.

In addition, in the manufacture of optical fiber ribbons and multiple core optical fiber ribbons it is important that the ribbons manufactured be smoothly wound and the wound ribbons be smoothly drawn out at a specific rate to smoothly manufacture optical fiber cables in the succeeding step. Conventionally, a lubricant such as silicone oil or a powder such as talc has been applied to the surface of the ribbon to provide a slippery surface, whereby smooth wind-up and draw-out operations of the optical fiber ribbons are ensured.

Another method to provide good surface slip characteristics is a method of including an additive such as silicone oil in the ribbon matrix material or the bundling material. The use of conventional additives, however, impairs the shelf life of the composition, that is, the addition of a large amount of additive causes the liquid composition to separate into two layers during storage, although the surface slip characteristics of the cured product are improved. If the amount of such an additive is too small, it is necessary to apply a powder such as talc when ribbons are produced, because the cured product does not have sufficient surface slip characteristics, even though the shelf life is excellent.

Furthermore, in a curable resin used as an up-jacketing material, a cured coating material must be easily removed in the course of fiber splicing.

The addition of silicone oil to up-jacketing materials has been known to allow the coated resin to be removed with ease. The use of conventional additives, however, impairs the shelf life of the composition, that is, the addition of a large amount of additive causes the liquid composition to separate into two layers during storage, although the cured material can be easily removed. If the amount is too small, no sufficient characteristics of cured product removal can be obtained, even though the shelf life is excellent.

SUMMARY OF THE INVENTION

An object of the present invention is therefore to provide a liquid curable resin composition having excellent shelf life, producing cured products with a slippery surface, and suitable for use as a coating material for optical fibers, especially as a ribbon matrix material or a bundling material.

Another object of the present invention is to provide a liquid curable resin composition producing cured products which can be easily removed when used as a coating material, and suitable for use as a coating material for optical fibers with low hydroscopic properties, especially as an up-jacketing material.

These objects can be obtained by the present invention by providing a liquid curable resin composition comprising: (a) a first polydimethylsiloxane comprising (i) at least two urethane bonds, (ii) an organic group unreactive to vinyl polymerization attached to at least one end of the first polydimethylsiloxane, and (iii) a (meth)acryloyl group attached to at least one end of the first polydimethylsiloxane, and (b) a second polydimethylsiloxane comprising (i) at least two urethane bonds and (ii) an unreactive organic group attached to at least one end of the second polydimethylsiloxane (other than (a)).

This liquid curable resin composition of the first invention is particularly preferred as a ribbon matrix material or a bundling material.

The above-described objects can be further obtained by the present invention by providing a liquid curable resin composition comprising: (a) a first polydimethylsiloxane comprising: (i) at least two urethane bonds, (ii) an unreactive organic group attached to at least one end of the first polydimethylsiloxane, and (iii) a (meth)acryloyl group attached to at least one end of the first polydimethylsiloxane, (b) a second polydimethylsiloxane comprising (i) at least two urethane bonds and (ii) an unreactive organic group attached to at least one end of the second polydimethylsiloxane (other than (a)), and (c) a third polysiloxane which does not contain any urethane bonds.

The liquid curable resin composition including the third polysiloxane which does not contain a urethane bond is particularly preferred as an up-jacketing material.

DETAILED DESCRIPTION OF THE INVENTION

The first polydimethylsiloxane used in the present invention has at least two urethane bonds and a (meth)acryloyl group attached to at least one end of said first polydimethylsiloxane as mentioned above. At least two urethane bonds are required for the polydimethylsiloxane compound to be mutually soluble in other components, thereby improving the shelf life of the liquid curable resin composition.

The urethane bonds can be produced by the reaction of a polyisocyanate and a reactive silicone compound having a hydroxyl group attached to at least one end of the reactive silicone compound, and a (meth)acrylate compound having a hydroxyl group attached thereto.

Given as examples of the polyisocyanate which can be used for this purpose are a diisocyanate such as 2,4-toluene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4cyclohexyl)isocyanate, 2,2,4-trimethylhexamethylene diisocyanate, bis(2-isocyanate-ethyl) fumarate, 6-isopropyl1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, and 2,5(or 6)-bis(isocyanatemethyl) bicyclo{2.2.1}heptane. Among these diisocyanates, 2,4-toluene diisocyanate, isophorone diisocyanate, xylylene diisocyanate, and methylenebis(4-cyclohexylisocyanate) are particularly preferred. These polyisocyanate compounds are used either individually or in combinations of two or more.

The first polydimethylsiloxane compound of the present invention can be produced by reacting a silicone compound comprising: a hydroxyl group attached to at least one end of said silicone compound and an unreactive organic group attached to at least one end of said silicone compound; a polyisocyanate and a (meth)acrylate compound that has a hydroxyl group attached thereto. Here, "unreactive" means absence of reactivity of vinyl polymerization and "reactive organic group" means a structure reactive to vinyl polymerization other than an acryl group or vinyl group.

Given as examples of such a silicone compound are silicone compounds having at least one hydroxyl group on one terminal, such as silicone compounds having an organic group such as 3-(2'-hydroxyethoxy)propyl group or, 3-(2',3'-dihydroxypropyloxy)propyl group, and the unreactive organic group such as trimethylsilyloxy group on another terminal. These silicone compounds may be used either individually or in combinations of two or more.

Given as specific examples of silicone compounds having hydroxyl group on one terminal are α-{3-(2'-hydroxyethoxy) propyl}-ω-trimethylsilyloxy-polydimethylsiloxane, α-{3-(2'hydroxyethoxy)propyl}-ω-trimethylsilyloxypolyethylenediphenyl siloxane, α-{3- (2',3'-dihydroxypropyloxy)propyl}-ω-trimethyl silyloxypolydimethylsiloxane, α-{3-(2',3'-dihydroxypropyloxy)propyl}-ω-trimethylsilyloxypolyethylenediphen ylsiloxane.

This type of silicone compound having at least one hydroxyl group attached to one molecular terminal is commercially available under trademarks such as Silaplane FM-0411, FM-0413, FM-0415, FM0421, FM-0425, FM-D411, FM-D421, FM-D425 (manufactured by Chisso Corp.) and Shin-Etsu Silicone X-22-170A, X-22-170B, X22-170D, X-22-176B, X-22-176D, X-22-176DX, X-22-178A, X-22-178B (manufactured by Shin-Etsu Chemical Co., Ltd.).

A (meth)acryloyl group is necessary for providing the polydimethylsiloxane compound used in the present invention to be polymerizable through radical polymerization. The (meth)acryloyl group is obtained by reacting the (meth) acrylate containing a hydroxyl group with a polyisocyanate.

Given as examples of the (meth)acrylate having a hydroxyl group useful in the present invention are 2-hydroxyethyl (meth)acrylate, 2-hydroxypropyl (meth) acrylate, 2-hydroxybutyl (meth)acrylate, 2-hydroxy-3-phenyloxypropyl (meth)acrylate, 1,4-butanediol mono (meth)acrylate, 2-hydroxyalkyl(meth)acryloyl phosphate, 4-hydroxycyclohexyl (meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, (meth)acrylates represented by the following structural formulas (1) or (2), $$CH_2=C(R^1)-COOCH_2CH_2-(OCOCH_2CH_2CH_2CH_2CH_2)_n-OH \quad (1)$$

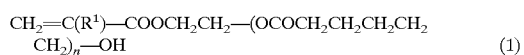

$$CH_2=C(R^1)-COOCH_2CH(OH)CH_2-O-(C_6H_5) \quad (2)$$

wherein $R^1$ is a hydrogen atom or a methyl group and n denotes an integer from 1–15. In addition, compounds obtained by an addition reaction between a compound containing a glycidyl group, such as, alkyl glycidyl ether, allyl glycidyl ether, or glycidyl (meth)acrylate, and (meth) acrylic acid can also be used. Among these (meth)acrylates having a hydroxyl group, particularly desirable are 2-hydroxyethyl acrylate and 2hydroxypropyl acrylate. These hydroxyl group containing (meth)acrylates may be used either individually or in combinations of two or more.

The first polydimethylsiloxane compound may be obtained by: (i) reacting the silicone compound having a hydroxyl group, the polyisocyanate compound, and the (meth)acrylate having a hydroxyl group altogether; (ii) reacting the silicone compound having a hydroxyl group and the polyisocyanate compound, and then reacting the resulting product with the (meth)acrylate having a hydroxyl group; and (iii) reacting the polyisocyanate and the (meth) acrylate having a hydroxyl group, and then reacting the resulting product with the silicone compound having a hydroxyl group. It is desirable that the hydroxyl groups of the silicone compound and (meth)acrylate compound are present in an amount almost equivalent to the amount of isocyanate groups in the polyisocyanate compound.

The structure of a polyurethane polyol and the like can be introduced between the polydimethylsiloxane structure and the (meth)acryloyl group by adding a polyol compound to the starting material of the above reactions.

Examples of polyols useful in the present invention are: polyether diols, polyester diols, polycarbonate diols, polycaprolactone diols, and the like. These polyols may be used either individually or in combinations of two or more. The manner of polymerization of each constitutional unit in these polyols is not specifically limited and may be random polymerization, block polymerization, or graft polymerization.

Given as specific examples of polyether diols are polyethylene glycol, polypropylene glycol, polytetramethylene glycol, polyhexamethylene glycol, polyheptamethylene glycol, polydecamethylene glycol, and polyether diols obtained by the ring-opening copolymerization of two or more ionic-polymerizable cyclic compounds. Examples of the ionic-polymerizable cyclic compound include cyclic ethers such as ethylene oxide, propylene oxide, butane-1-oxide, isobutene oxide, 3,3'-bis-chloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrine, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidylbenzoate. Specific examples of the combination of two or more types of ionic-polymerizable cyclic compounds are tetrahydrofuran and propylene oxide, tetrahydrofuran and 2-methyltetrahydrofuran, tetrahydrofuran and 3methyltetrahydrofuran, tetrahydrofuran and ethylene oxide, propylene oxide and ethylene oxide, and a ternary copolymer of butene-1-oxide and ethylene oxide, and tetrahydrofuran, ethylene oxide and butene-1-oxide. It is also possible to use polyether diols obtained by ring-opening copolymerization of the above-mentioned ionic-polymerizable cyclic compounds and a cyclic imine such as ethylene imine, a cyclic lactone such as b-propiolactone and glycolic acid lactide, or a dimethylcyclopolysiloxane. These ring-opening copolymer units of ionic-polymerizable cyclic compounds may be either a random copolymer or a block copolymer.

Polyester diols are obtained from the reaction of a polyhydric alcohol and a polybasic acid. Examples of polyhydric alcohols useful to make polyester diols are: ethylene glycol, polyethylene glycol, propylene glycol, polypropylene glycol, tetramethylene glycol, polytetramethylene glycol, 1,6-hexanediol, neopentyl glycol, 1,4-cyclohexane dimethanol, 3-methyl-1, 5-pentanediol, 1,9-nonanediol, and 2-methyl-1,8-octanediol. Examples of polybasic acids useful to make polyester diols are: phthalic acid, isophthalic acid, terephthalic acid, maleic acid, fumaric acid, adipic acid, and sebacic acid. Commercially available polyester diols which can be used include, for example, Kurapol P-2010, PMIPA, PKA-A, PKA-A2, PNA-2000 (manufactured by Kuraray Co.).

Examples of polycarbonate diols are those obtained from polytetrahydrofuran and 1,6-hexanediol. The polycarbonate diols are also commercially available under trademarks, for example, of DN-980, DN-981, DN-982, DN-983 (manufactured by Nippon Polyurethane), PC-8000 (manufactured by PPG of the US), and PC-THF-CD (manufactured by BASF).

Examples of polycaprolactone diols useful in the instant invention include polycaprolactone diols obtained by the reaction of e-caprolactone and a diol. Such a diol may be, for example, ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexane dimethanol, and 1,4-butanediol. These polycaprolactone diols are also commercially available under trademarks such as PLACCEL 205, 205AL, 212, 212AL, 220, 220AL (manufactured by Daicel Chemical Industries, Ltd.).

Polyols other than the above-described polyol compounds can be used. Examples of useful polyols include: dimethylol compounds of ethylene glycol, propylene glycol, 1,4-butanediol, 1,5-pentanediol, 1,6-hexanediol, neopentyl glycol, 1,4-cyclohexane dimethanol, hydrogenated bisphenol A, hydrogenated bisphenol F, or dicyclopentadiene; tricyclodecane dimethanol, pentacyclopentadecane dimethanol, β-methyl-δ-valerolactone, polybutadiene with terminal hydroxyl groups, hydrogenated polybutadiene with terminal hydroxyl groups, castor oil modified polyol, and polymethylsiloxane carbitol-modified polyols.

The molecular weight of these polyols in terms of the number average molecular weight based on polystyrene standard is usually 50–15,000, and preferably 100–8,000.

The reaction for obtaining the first polydimethylsiloxane compound containing a polyol structure may be carried out, for example, by: (i) reacting together the silicone compound having a hydroxyl group, the polyol compound, the polyisocyanate compound, and (meth)acrylate having a hydroxyl group; (ii) reacting the polyol and polyisocyanate, and then reacting the silicone compound having a hydroxyl group and the (meth)acrylate compound having a hydroxyl group; (iii) reacting the polyisocyanate, silicone compound having a hydroxyl group, and the (meth)acrylate having a hydroxyl group, and then reacting the resulting product with the polyol compound; (iv) reacting the polyisocyanate and silicone compound having a hydroxyl group, then reacting the polyol compound, and finally reacting the (meth)acrylate having a hydroxyl group; and (v) reacting the polyisocyanate and (meth)acrylate having a hydroxyl group, then reacting the polyol compound, and finally reacting the silicone compound having a hydroxyl group.

As mentioned above, the urethane bond in the first polydimethylsiloxane of the present invention is introduced into only one of the terminal ends of the polydimethylsiloxane structure. If introduced into all terminal ends of the polydimethylsilaxane structure, the resulting product may not exhibit intended surface slip characteristics.

These polydimethylsiloxane compounds may be used either individually or in combinations of two or more.

The first polydimethylsiloxane of the present invention has a number average molecular weight reduced to polystyrene of 800–15,000, and preferably 1,000–7,000. If the number average molecular weight is less than 800, the cured product produced from the composition may not have sufficient surface slip characteristics; if the number average molecular weight is more than 15,000, the cured product produced from the composition may have a poor liquid shelf life.

The first polydimethylsiloxane is preferably contained in the liquid curable resin composition of the present invention in an amount of 0.05–10% by weight, particularly preferably 0.1–7% by weight. If less than 0.05% by weight, the cured product produced from the composition may not have sufficient surface slip characteristics; if more than 10% by weight, the cured product produced from the composition may have a poor liquid shelf life.

As mentioned above, the second polydimethylsiloxane of the present invention contains at least two urethane bonds, has no (meth)acryloyl groups and has an unreactive organic group attached to at least one end of said second polydimethylsiloxane. Preferably, each terminal group of this second polydimethylsiloxane has an unreactive group. The second polydimethylsiloxane improves the surface slip characteristics of the liquid curable resin composition of the present invention. Having at least two urethane bonds in the second polymethylsiloxane improves mutual solubility of the second polydimethylsiloxane compound (b) with other components, thereby increasing the shelf life of the resulting liquid curable resin composition.

The second polydimethylsiloxane can be prepared by reacting two moles of a silicone compound having one hydroxyl group and two moles of isocyanate groups of a polyisocyanate compound. Examples of reactions that produce the second polydimethylsilaxane are: (i) a reaction between α-{3- (2'-hydroxyethoxy)propyl}-ω-trimethylsilyloxypolyd imethylsiloxane and 2,5(or 2,6)-bis (isocyanatemethyl)-bicyclo{2.2.1}heptane; (ii) a reaction between α-{3- (2'-hydroxyethoxy)propyl}-ω-trimethylsilyloxypolye thylene diphenylsiloxane and 2,4-tolylene diisocyanate; (iii) a reaction between α-{3- (2'-hydroxy-3'-isopropylamino)propyl}-ω-trimethylsilyloxypolydimethylsiloxane and isophorone diisocyanate; and (iv) a reaction between α-{3- (2'-hydroxy-3'-isopropylamino)propyl}-ω-trimethylsilyloxypolydimethylsiloxane and 2,4-tolylene diisocyanate.

This type of silicone compound having a hydroxyl group at one terminal end is commercially available under trademarks such as Silaplane FM-0411, FM-0413, FM-0415, FM0421, (manufactured by Chisso Corp.) and Shin-Etsu Silicone X22-170A, X-22-170B, X-22 170D, X-22-178A, X-22-178B (manufactured by Shin-Etsu Chemical Co., Ltd.).

The second polydimethylsiloxane of the present invention has a number average molecular weight reduced to polystyrene of 800–13,000, and preferably 1,500–5,000. If the number average molecular weight is less than 800, the cured product produced from the composition may not have sufficient surface slip characteristics; if the number average molecular weight is more than 13,000, the cured product produced from the composition may have a poor liquid shelf life.

The second polydimethylsiloxane is preferably contained in the liquid curable resin composition of the present invention in an amount of 0.05–2% by weight, particularly preferably 0.1–1% by weight. If less than 0.05% by weight, the cured product produced from the composition may not have sufficient surface slip characteristics; if more than 2% by weight, the cured product produced from the composition may have a poor liquid shelf life.

The above-described first and second polydimethylsiloxane compounds are the components which are commonly contained in the compositions of the present inventions. The liquid curable resin composition particularly suitable for upjacketing coatings, preferably further contains a third polysiloxane compound which does not contain a urethane bond. This third polysiloxane compound increases the mutual solubility of the first and second polydimethylsiloxane compounds and the other components and improves shelf life of the liquid curable resin composition.

Given as examples of the third polysiloxane compound which does not include a urethane bond are polydimethylsiloxanepolyoxyethylene copolymer, polymethylsiloxanepolyoxypropylene copolymer, polydimethylsiloxanepolyoxyethylene-polyoxypropylene copolymer, and polydimethylsiloxane-polyalkylene copolymer. Commercially available products are DC-57, DC-190 (manufactured by Dow Corning Co.), SH-28PA, SH-29PA, SH-30PA, SH-190, SH-510 (manufactured by Toray-Dow-Corning Silicone Co.), KF351, KF352, KF353, KF354 (manufactured by Shin-Etsu Chemical Co., Ltd.), and L-700, L-7002, L-7500, FK-024-90 (manufactured by Nippon Unicar Co., Ltd.).

The third polysiloxane is included in the liquid curable resin composition of the present invention in an amount of 0.01–2% by weight, particularly preferably 0.01–1% by weight. If the amount of the third polysiloxane is less than 0.01% by weight, mutual solubility of the first and second polydimethylsiloxane compounds and the other components may be insufficient and the shelf life of the liquid curable resin composition may be poor. If the amount of the third polysiloxane is more than 2% by weight, mutual solubility between the third polysiloxane and the other components may be inadequate, resulting in impaired shelf life of the resulting liquid curable resin composition.

The liquid curable resin compositions of the present invention may contain a urethane (meth)acrylate oligomer obtained by the reaction of a polyol, a diisocyanate, and a (meth)acrylate containing a hydroxyl group.

Such a urethane (meth)acrylate can be produced by reacting the isocyanate group of the diisocyanate and the hydroxyl group of the polyol and the (meth)acrylate containing a hydroxyl group.

This reaction may be carried out, for example, by: (i) reacting the polyol, the diisocyanate, and the (meth)acrylate having a hydroxyl group altogether; (ii) reacting the polyol and the diisocyanate, and then reacting the resulting product with the (meth)acrylate having a hydroxyl group; (iii) reacting the diisocyanate and the (meth)acrylate having a hydroxyl group, and then reacting the resulting product with the polyol; and (iv) reacting the diisocyanate and the (meth)acrylate having a hydroxyl group, reacting the resulting product with the polyol, and then again reacting the product thereby obtained with the (meth)acrylate having a hydroxyl group.

The same polyol compounds, diisocyanate compounds, and (meth)acrylate compounds having a hydroxyl group as mentioned above can be used in the above reactions.

The polyol, the diisocyanate, and the (meth)acrylate containing a hydroxyl group are used preferably in a proportion such that for one equivalent of the hydroxyl group of the polyol, 1.1–3 equivalents of the isocyanate group contained in the diisocyanate and 0.2–1.5 equivalents of the hydroxyl group contained in the (meth)acrylate are used. In addition, it is desirable that the equivalent of the hydroxy groups in the polyol and the (meth)acrylate is almost the same as the equivalent of the isocyanate group in the diisocyanate.

In the reaction of these compounds, a catalyst for the urethane forming reaction such as copper naphthenate, cobalt naphthenate, zinc naphthenate, n-butyl-tin-dilaurylate, triethylamine, 1,4-diazabicyclo{2.2.2}octane, or 2,6,7-trimethyl-1,4-diazabicyclo{2.2.2}octane is used, generally, in an amount of 0.01 to 1 part by weight for 100 parts by weight of the reaction raw materials. The reaction temperature is normally in the range of 10–90° C., preferably of 30–80° C.

The urethane (meth)acrylate thus obtained is incorporated in the composition in an amount of 0–90% by weight. An amount of 20–70% by weight is more preferred, especially in the case where excellent coatability on the optical fiber, superior tensile break strength and tensile elongation at break of the coated material after cure, and long-term reliability of the products are desired.

In addition to these components, a urethane (meth) acrylate obtained by reacting two moles of (meth)acrylate containing a hydroxyl group with one mol of diisocyanate can be incorporated in the liquid curable resin composition of the present invention. Given as examples of such a urethane (meth)acrylate are the reaction product of hydroxyethyl (meth)acrylate and 2,5(or 2,6)-bis-(isocyanatemethyl) bicyclo{2.2.1}heptane, the reaction product of hydroxyethyl (meth)acrylate and 2,4-toluene diisocyanate, the reaction product of hydroxyethyl (meth)acrylate and isophorone diisocyanate, the reaction product of hydroxypropyl (meth) acrylate and 2,4-toluene diisocyanate, and the reaction product of hydroxypropyl (meth)acrylate and isophorone diisocyanate.

In addition to the urethane (meth)acrylate, reactive diluents containing a vinyl group or a (meth)acryloyl group can be used in liquid curable resin compositions of the present invention. Monofunctional monomers and polyfunctional monomers are reactive diluents that can be included in such polymerizable monomers. Given as examples of the monofunctional monomers are monomers containing a vinyl group, such as N-vinyl pyrrolidone, N-vinyl caprolactam, vinyl imidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, 2-hydroxyethyl (meth)acrylate, 2-hydroxypropyl (meth) acrylate, 2-hydroxybutyl (meth)acrylate, methyl (meth) acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth) acrylate, undecyl (meth)acrylate, dodecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth) acrylate, benzyl (meth)acrylate, phenoxyethyl (meth) acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth) acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formulas (3) to (5).

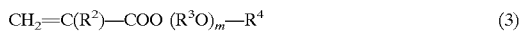

$$CH_2=C(R^2)-COO\ (R^3O)_m-R^4 \quad (3)$$

wherein $R^2$ is a hydrogen atom or a methyl group; $R^3$ is an alkylene group containing 2 to 6, preferably 2 to 4 carbon atoms; $R^4$ is a hydrogen atom or an alkyl group containing 1 to 12, preferably 1 to 9, carbon atoms; and m is an integer from 0 to 12, and preferably from 1 to 8.

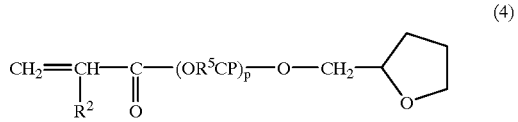

(4)

wherein $R^2$ is the same as defined above; $R^5$ is an alkylene group containing 2 to 8, preferably 2 to 5, carbon atoms; and p is an integer from 1 to 8, and preferably from 1 to 4.

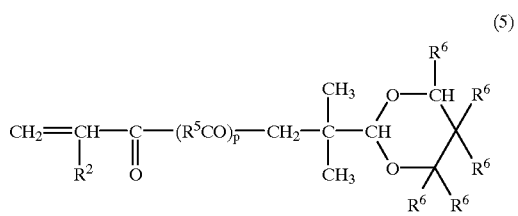

(5)

wherein $R^2$, $R^5$, and p are the same as defined above; and each $R^6$ is are individually a hydrogen atom or a methyl group. Commercially available monofunctional compounds include ARONIX M111, M113, M114, M117 (manufactured by Toagosei Co., Ltd.), KAYARAD TC110S, R629, R644 (manufactured by Nippon Kayaku Co., Ltd.), and Viscoat 3700 (manufactured by Osaka Organic Chemical Industry, Ltd.).

Examples of the polyfunctional monomers include monomers containing a (meth)acryloyl group such as trimethylolpropane tri(meth)acrylate, pentaerythritol tri(meth) acrylate, ethylene glycol di(meth)acrylate, tetraethylene glycol di(meth)acrylate, polyethylene glycol di(meth) acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl)isocyanurate di(meth)acrylate, tricyclodecanediyldimethyl di(meth)acrylate, and di(meth) acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether. Commercially available polyfunctional monomers include YUPIMER-UV, SA1002, SA2007 (manufactured by Mitsubishi Chemical Corp.), Viscoat 700 (manufactured by Osaka Organic Chemical Industry Co., Ltd.), KAYARAD R-604, DPCA-20, DPCA-30, DPCA-60, DPCA-120, HX-620, D-310, D-330, (manufactured by Nippon Kayaku Co., Ltd.), and ARONIX M-210, M-215, M-315, M-325 (manufactured by Toagosei Co., Ltd.). Among these polyfunctional monomers, tricyclodecanediyldimethyl di(meth)acrylate and diacrylate of polyoxyalkylated bisphenol A are particularly preferred.

These polymerizable monomers are preferably comprised in the composition in an amount less than 80 wt %, and particularly preferably 20–70 wt %. If this amount is more than 80 wt %, the curing speed may be slow.

The liquid curable resin compositions of the present invention can be cured by heat or radiation. Radiation here means the application of rays such as infrared light, visible light, ultraviolet light, X-rays, electron beams, α-rays, β-rays, and γ-rays.

The liquid curable resin compositions of the present invention preferably comprise a polymerization initiator. Either a thermal initiator or a photo initiator can be used as the polymerization initiator.

When the liquid curable resin composition of the present invention is cured by heat, a peroxide or an azo compound is usually used as a thermal initiator. Benzoyl peroxide, t-butyloxybenzoate, and azobisisobutylonitrile are given as specific examples.

When the liquid curable resin compositions of the present invention are cured by radiation, a photo initiator is used. As required, a photosensitizer is added. Here, examples of the photo initiator include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3—methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropa-1-one, 2-hydroxy-2-methyl-1-phenylpropa-1-one, thioxanthone, diethylthioxanthone, 2-isopropylthioxanthone, 2-chlorothioxanthone, 2-methyl-1-{4-methylthio)phenyl}-2-morpholino-propa-1-one, 2,4,6-trimethylbenzoyldiphenyl phosphine oxide, and bis(2,6-dimethoxybenzoyl)-2,4,4-trimethylpentyl-phosphine oxide; and commercially available products, such as Irgacure 184, 369, 651, 500, 907, CGI1700, CGI1750, CGI1850, CG24-61 (manufactured by Ciba Geigy), Lucirin LR8728 (manufactured by BASF), Darocure 1116, 1173 (manufactured by Merck Co.), and Uvecryl P36 (manufactured by UCB). Given as examples of the photo-sensitizers are triethylamine, diethylamine, N-methyldiethanolamine, ethanolamine, 4-dimethylminobenzoic acid, methyl 4-dimethylaminobenzoate, ethyl 4-dimethylminobenzoate, isoamyl 4-dimethylminobenzoate, and commercially available products such as Uvecryl P102, P103, P104, and P105 (manufactured by UCB Co).

When the liquid curable resin compositions of the present invention are cured by heat and radiation, the above-described thermal initiators and photo initiators may be used togetherThe polymerization initiators are used in an amount of 0.1–10 wt %, preferably 0.5–7 wt %, in the composition.

In addition to the above components, the liquid curable resin compositions of the present invention may be formulated with other curable oligomers or polymers to the extent that the effect of the present invention is not adversely affected.

Included in the examples of the other curable oligomers or polymers are polyester (meth)acrylates, epoxy (meth) acrylates, polyamide (meth)acrylates, siloxane polymers having a (meth)acryloyloxy group, and reactive polymers which are obtained by the reaction of acrylic acid and a copolymer of glycidyl (meth)acrylate and another polymerizable monomer.

Furthermore, amines may be added to the liquid curable resin composition of the present invention to suppress generation of hydrogen gas which causes a transmission loss in optical fibers. The amines which can be added include diallylamine, diisopropylamine, diethylamine, and diethylhexylamine.

In addition to these, various additives may be added as required, such as antioxidants, UV absorbers, light-stabilizers, silane coupling agents, thermal polymerization inhibitors, leveling agents, coating surface improvers, heat polymerization inhibitors, leveling agents, surfactants, coloring materials, preservatives, plasticizers, lubricants, solvents, fillers, anti-oxidant, and wettability improvers. Commercially available antioxidants which can be used are Irganox 1010, 1035, 1076, 1222 (manufactured by Ciba Geigy), Antigene P, 3C, FR, GA-80 (manufactured by Sumitomo Chemical Co., Ltd.), and the like. As UV absorbers, Tinuvin P, 234, 320, 326, 327, 328, 329, 213 (manufactured by Ciba Geigy), Seesorb 102, 103, 110, 501, 202, 712, 704 (manufactured by Sypro Chemical Co.) can be given. Commercially available light-stabilizers which can be added include Tinuvin 292, 144, 622LD (manufactured by Ciba Geigy), Sanol LS770 (manufactured by Sankyo Chemical Industries, Ltd.), and Sumisorb TM-061 (manufactured by Sumitomo Chemical Co., Ltd.). Examples of silane coupling agents which can be given are γ-aminopropyltriethoxy silane, γ-mercaptopropyltrimethoxy silane, γ-methacryloxypropyl-trimethoxy silane, and commercial products such as SH6062, SH6030 (manufactured by Toray Dow Corning Silicone Co.) and KBE903, KBE603, KBE403 (manufactured by Shin-Etsu Chemical Co. Ltd.). As the leveling agent, silicone additives such as dimethylsiloxane polyether and commercially available products, such as DC-57, DC-190 (manufactured by Dow Corning Co.), SH-28PA, SH-29PA, SH-30PA, SH-190 (manufactured by Toray-Dow Corning Co.), KF351, KF352, KF353, KF354 (manufactured by Shin-Etsu Chemical Co., Ltd.), and L-700, L-7002, L-7500, FK-024-90 (manufactured by Nippon Unicar Co., Ltd.), can be given as examples.

The viscosity of the liquid curable resin composition of the present invention is normally in the range of 200 to 20,000 cps at 25° C., and preferably 2,000 to 15,000 cps at 25° C. When the composition is used as a ribbon matrix material, a bundling material for optical fibers, or an up-jacketing material, the Young's modulus of the composition after curing is normally 10–250 kg/mm$^2$, and preferably 40–150 kg/mm$^2$.

It is desirable that the ribbon matrix materials and bundling materials for optical fibers have a surface slip characteristic of 0.1–1.5 kg/cm$^2$, particularly 0.1–1.0 kg/cm$^2$. If the surface slip characteristic is more than 1.5 kg/cm$^2$, optical fiber ribbons cannot be drawn at a specific constant speed when optical fiber cables are manufactured; if less than 0.1 kg/cm$^2$, the surface of the optical fiber ribbons is too slippery for orderly winding.

In addition, it is desirable that the up-jacket material have a coating removal capability of 1–10 g/cm, particularly 1–3 g/cm, in terms of UV ink-cured material adhesion strength. If the adhesion strength is more than 10 g/cm, coatings can be removed only with difficulty during a fiber splicing; if less than 1 g/cm, delamination may occur between the UV ink and the up-jacketing after manufacturing up-jacketing fibers. The water absorption of the cured material is preferably 3.0% or less, particularly preferably 2.0% or less.

EXAMPLES

The present invention will be hereinafter described in more detail by way of examples which are given for illustration of the present invention and shall not to be construed as limiting the present invention. In the examples hereinafter "part(s) by weight" is simply described as "part(s)"

Synthesis of Polydimethylsiloxane Compound (a)
(SA-1)

2.8 parts of 2,4-tolylene diisocyanate, 95.4 parts of α-{3-(2'-hydroxyethoxy)-propyl}-ω-trimethylsilyloxypolydimethylsiloxane with a hydroxyl equivalence of 6,000, and 0.02 parts of 2,6-di-t-butyl-p-cresol, as a polymerization inhibitor, were introduced into a reaction vessel equipped with a stirrer. The mixture was cooled with ice to a temperature of below 10° C. while stirring, at which temperature 0.08 part of dibutyl tin dilaurate was added. Then, the mixture was stirred for one hour while controlling the temperature at 20–30° C., and for two hours at 40–50° C. After the addition of 1.8 parts of 2-hydroxyethyl acrylate, the mixture was stirred for a further three hours while controlling the temperature at 50–60° C. The reaction was terminated when the amount of residual isocyanate group was reduced to 0.1 wt % or less. The number average molecular weight of the resulting polydimethylsiloxane (reduced to polystyrene, measured by gel permeation chromatography using HLC-8020™ manufactured by Tosoh Corp., hereinafter the same) was 6,100. The polydimethylsiloxane resin liquid obtained was designated as SA-1.

Synthesis of Polydimethylsiloxane Compound (a)
(SA-2)

16.6 parts of isophorone diisocyanate, 0.08 part of dibutyl tin dilaurate, and 0.02 parts of 2,6-di-t-butyl-p-cresol were charged into a reaction vessel equipped with a stirrer, and the mixture was cooled to a temperature of below 15° C. 8.7 parts of 2-hydroxyethyl acrylate was added dropwise while stirring and controlling the temperature below 30° C. After the addition, the mixture was reacted for one hour at 30° C. Then, 74.7 parts of α-{3-(2'-hydroxyethoxy)-propyl}-ω-trimethylsilyloxypolydimethylsiloxane with a hydroxyl equivalence of 850 was added and the mixture was stirred at 20–55° C. The reaction was terminated when the amount of residual isocyanate group was reduced to 0.1 wt % or less. The number average molecular weight of the resulting polydimethylsiloxane was 1,400. The polydimethylsiloxane resin liquid obtained was designated as SA-2.

Synthesis of Polydimethylsiloxane Compound (a) (SA-3)

15.3 parts of 2,4-tolylene diisocyanate, 74.6 parts of α-{3-(2',3'-dihydroxypropyloxy)-propyl}-ω-trimethyl silyloxypolydimethylsiloxane with a hydroxyl equivalence of 850, and 0.02 parts of 2,6-di-t-butyl-p-cresol, as a polymerization inhibitor, were introduced into a reaction vessel equipped with a stirrer. The mixture was cooled with ice to a temperature of below 10° C. while stirring, at which temperature 0.08 parts of dibutyl tin dilaurate was added. Then, the mixture was stirred for one hour while controlling the temperature at 20–30° C., and for two hours at 40–50° C. Then, after the addition of 10.2 parts of 2-hydroxyethyl acrylate, the mixture was stirred-for a further three hours while controlling the temperature at 50–60° C. The reaction was terminated when the amount of the residual isocyanate group was reduced to 0.1 wt % or less. The number average molecular weight of the resulting polydimethylsiloxane was 1,800. The polydimethylsiloxane resin liquid obtained was designated as SA-3.

Synthesis of Polydimethylsiloxane Compound (a) (SA-4)

6.2 parts of 2,4-tolylene diisocyanate, 89.6 parts of α-{3-(2',3'-dihydroxypropyloxy)-propyl}-ω-trimethyl silyloxypolydimethylsiloxane with a hydroxyl equivalence of 250, and 0.02 part of 2,6-di-t-butyl-p-cresol were introduced into a reaction vessel equipped with a stirrer. The mixture was cooled with ice to a temperature of below 10° C. while stirring, at which temperature 0.08 part of dibutyl tin dilaurate was added. Then, the mixture was stirred for one hour while the temperature was controlled at 20–30° C., and for two hours at 40–50° C. After the addition of 4.2 parts of 2-hydroxyethyl acrylate, the mixture was stirred for a further three hours while the temperature was controlled at 50–60° C. The reaction was terminated when the amount of the residual isocyanate group was reduced to 0.1 wt % or less. The number average molecular weight of the resulting polydimethylsiloxane was 5,200. The polydimethylsiloxane resin liquid obtained is designated as SA-4.

Synthesis of Polydimethylsiloxane Compound (a) (SA-5)

22.8 parts of 2,4-tolylene diisocyanate, 65.5 parts of α-{3-(2'-dihydroxyethoxy)-propyl}-ω-trimethylsilyloxypolydimethyl siloxane with a hydroxyl equivalence of 1,000, and 0.02 part of 2,6-di-t-butyl-p-cresol were introduced into a reaction vessel equipped with a stirrer. The mixture was cooled with ice to a temperature of below 10° C. while stirring, at which temperature 0.08 part of dibutyl tin dilaurate was added. Then, the mixture was stirred for two hours while controlling the temperature at 20–30° C., and for one hour at 40–50° C. After the addition of 4.1 parts of ethylene glycol, the mixture was stirred for 0.5 hours while controlling the temperature at 20–30° C. and for one hour at 40–50° C. Then, 7.6 parts of 2-hydroxyethyl acrylate was added, followed by stirring the mixture for a further two hours while controlling the temperature at 50–60° C. The reaction was terminated when the amount of the residual isocyanate group was reduced to 0.1 wt % or less. The number average molecular weight of the resulting polydimethylsiloxane was 1,800. The polydimethylsiloxane resin liquid obtained was designated as SA-5.

Synthesis of Polydimethylsiloxane Compound (b) (SB-1)

8.0 parts of 2,4-tolylene diisocyanate, 92.0 parts of α-{3-(2'-dihydroxyethoxy)-propyl}-ω-trimethyl-silyloxypolydimethylsiloxane with a hydroxyl equivalence of 1,000, and 0.02 parts of 2,6-di-t-butyl-p-cresol, as a polymerization inhibitor, were introduced into a reaction vessel equipped with a stirrer0.08 parts of dibutyl tin dilaurate was added while stirring at room temperature. Then, the mixture was further stirred for one hour while controlling the temperature at 20–30° C. and for three hours at 50–60° C. The reaction was terminated when the amount of residual isocyanate group was reduced to 0.1 wt % or less. The number average molecular weight of the resulting polydimethylsiloxane was 2,200. The polydimethylsiloxane resin liquid obtained was designated as SB-1.

Synthesis of Polydimethylsiloxane Compound (b) (SB-2)

5.3 parts of isophorone diisocyanate, 94.7 parts of α-{3 (2'-dihydroxyethoxy)-propyl}-ω-trimethylsilyloxypolydimethyl siloxane with a hydroxyl equivalence of 2,000, and 0.02 parts of 2,6-di-t-butyl-p-cresol, as a polymerization inhibitor, were charged into a reaction vessel equipped with a stirrer. 0.08 parts of dibutyl tin dilaurate was added while stirring at room temperature. Then, the mixture was further stirred for one hour while controlling the temperature at 20–30° C. and for three hours at 50–60° C. The reaction was terminated when the amount of residual isocyanate group was reduced to 0.1 wt % or less. The number average molecular weight of the resulting polydimethylsiloxane was 4,300. The polydimethylsiloxane resin liquid obtained was designated as SB-2.

Synthesis of Urethane Acrylate (UA-1)

14 parts of 2,4-toluene diisocyanate, 0.08 parts of dibutyl tin dilaurate, 0.02 parts of 2,6-di-tert-butyl cresol, 7.7 parts of N-vinylpyrrolidone, and 15.5 parts of tricyclodecanediyldimethyl diacrylate were introduced in to a reaction vessel equipped with a stirrer and the mixture was cooled to 5–10° C. After the addition of 5.8 parts of 2-hydroxyethyl acrylate dropwise while controlling the temperature below 10° C., the mixture was reacted for one hour at 30° C. Then, 1.7 parts of ethylene glycol and 54.7 parts of polytetramethylene glycol having a number average molecular weight of 2,000 were added and the mixture was stirred for two hours at 30–50° C. After the further addition of 0.5 parts of 2-hydroxyethyl acrylate, the reaction was continued at 50–60° C. until the amount of residual isocyanate group was reduced to 0.1 wt % or less, to obtain a resin liquid UA-1.

Synthesis of Urethane Acrylate (UA-2)

6.3 parts of 2,4-tolylene diisocyanate, 0.001 part of dibutyl-tin dilaurate, 0.009 parts of 2,6-di-t-butyl-p-cresol, and 16 parts of isobornyl acrylate were introduced into a reaction vessel equipped with a stirrer and the mixture was cooled to 5–10° C. After the addition of 8.4 parts of 2-hydroxyethyl acrylate dropwise while controlling temperature below 40° C., the mixture was reacted for one hour at 45–55° C. until the amount of residual isocyanate group was reduced to 0.1 wt % or less. To the reaction mixture were added 2.6 parts of N-vinylpyrrolidone, 6.8 parts of tricyclodecanediyldimethyl diacrylate, 0.3 parts of 2,2'-thiodiethylenebis{3-(3,5-di-t-butyl-4-hydroxyphenyl) }propionate), 56 parts of UA-1, and 0.1 part of diethylamine. This mixture was stirred at 40–50° C. to obtain a transparent, homogeneous liquid. This resin liquid is designated as UA-2.

Synthesis of Both-Terminal Reactive Polydimethyl-Siloxane Compound (RA-1, Comparative Compound)

22 parts of 2,4-tolylene diisocyanate, 63.3 parts of α,ω-bis{3- (2'-hydroxyethoxy)propyl}-polydimethylsiloxane with a hydroxyl equivalence of 500, and 0.02 parts of 2,6-di-t-butylp-cresol were introduced into a reaction vessel equipped with a stirrer. The mixture was cooled with ice to a temperature of below 10° C. while stirring, at which temperature 0.08 parts of dibutyl tin dilaurate was added. Then, the mixture was stirred for one hour while controlling the temperature at 20–30° C. and for two hours at 40–50° C. Then, 14.7 parts of 2-hydroxyethyl acrylate was added, followed by stirring for a further three hours while controlling the temperature at 50–60° C. The reaction was terminated when the amount of the residual isocyanate group was reduced to 0.1 wt % or less. The number average molecular weight of the resulting polydimethylsiloxane was 1,500. The polydimethylsiloxane resin liquid obtained was designated as RA-1.

Polydimethylsiloxane-polyoxyethylene copolymer (SH-20PA, manufactured by Toray-Dow-Corning Silicone Co.) was used as a polysiloxane compound which contains no urethane group. This polysiloxane compound was designated as SC-1.

Examples 1–7, Comparative Examples 1–3

(Preparation of liquid curable resin compositions)

The components shown in Table 1 were introduced into a reaction vessel equipped with a stirrer. The mixture was stirred for 3 hours while controlling the temperature at 50–60° C. to prepare liquid curable resin compositions.

TABLE 1

|  | Example |  |  |  |  |  |  | Comparative Example |  |  |
|---|---|---|---|---|---|---|---|---|---|---|
|  | 1 | 2 | 3 | 4 | 5 | 6 | 7 | 1 | 2 | 3 |
| SA-1 | 0.1 | 0 | 0 | 0 | 0.5 | 1.0 | 0 | 0 | 0 | 0 |
| SA-2 | 0 | 1.0 | 0 | 0 | 0 | 1.0 | 0 | 0 | 0 | 0 |
| SA-3 | 0 | 0 | 3.0 | 0 | 0 | 0 | 0 | 0 | 0 | 0 |
| SA-4 | 0 | 0 | 0 | 1.0 | 1.0 | 0 | 0 | 0 | 0 | 0 |
| SA-5 | 0 | 0 | 0 | 0 | 0 | 0 | 3.0 | 0 | 0 | 0 |
| SB-1 | 0.1 | 0.2 | 0.5 | 0 | 0 | 0.1 | 0.5 | 0 | 0 | 0 |
| SB-2 | 0 | 0 | 0 | 0.2 | 0.2 | 0 | 0 | 0 | 0 | 0 |
| RA-1 | 0 | 0 | 0 | 0 | 0 | 0 | 0 | 0 | 0 | 5.0 |
| UA-2 | 98.2 | 95.7 | 93.5 | 97.2 | 96.8 | 96.4 | 94.5 | 98.5 | 97.0 | 92.0 |
| Photoinitiator (a) | 0 | 0 | 0 | 1.5 | 0 | 0 | 1.5 | 0 | 0 | 0 |
| Photoinitiator (b) | 1.5 | 0 | 0 | 0 | 1.5 | 1.5 | 0 | 1.5 | 0 | 1.5 |
| Photoinitiator (c) | 0 | 3.0 | 3.0 | 0 | 0 | 0 | 0 | 0 | 3.0 | 0 |
| Coating surface improver (d) | 0.1 | 0.1 | 0 | 0.1 | 0 | 0 | 0.5 | 0 | 0 | 1.5 |

(a) 2,4, 6-Trimethylbenzoyldiphenylphosphine oxide
(b) A mixture of bis(2,6-dimethoxybenzoyl)-2,4,4-trimethylpentylphosphine oxide and 1-hydroxycyclohexyl phenyl ketone (weight ratio: 50:50)
(c) 1-Hydroxycyclohexyl phenyl ketone
(d) Graft polymer of dimethylsiloxane polycarbinol

Test Examples

The liquid curable resin compositions prepared above were cured to produce test specimens by the method described below. The test specimens were subjected to evaluation according to the following methods.

1. Preparation of test specimens

The liquid curable resin composition was applied to glass plates using an applicator bar with a thickness of 250 mm, and irradiated with UV light at 0.5 J/cm$^2$ under a nitrogen atmosphere. The cured films were aged at 23° C. and 50% RH for over 12 hours, removed from the glass plate, cut into strips with a width of 3 cm, and secured to an aluminum plate using a double-sided adhesive tape with the irradiated surface facing upward. Two such test leaves were layered with the cured surfaces face by face, secured with a double clip, and subjected to a surface friction force test.

2. Surface friction force test

A surface performance test was carried out at a pulling rate of 50 mm/min, the surface contact area of the cured film of 0.54 cm$^2$, and a pressure of 0.48 kg/cm$^2$ from the double clip. The shear slip stress (kg/cm$^2$) was calculated from the load at the initiation of slip.

3. Measurement of shelf life

To evaluate the shelf life, the liquid curable resin composition was allowed to stand at 60° C. for 30 days, following which the liquid resin was dropped onto a glass plate to microscopically observe separation of resin components on the surface of the liquid.

4. Measurement of viscosity

Viscosity of the liquid curable resin compositions was measured at 25° C. using a B-type viscometer manufactured by Tokyo Keiki Co., Ltd. The results are shown in Table 2.

TABLE 2

|  | Surface slip characteristic (kg/cm$^2$) | Shelf life of the liquid[1] | Viscosity (cps @25° C.) |
|---|---|---|---|
| Example 1 | 0.4 | O | 7900 |
| Example 2 | 0.3 | O | 7000 |
| Example 3 | 0.3 | O | 8500 |
| Example 4 | 0.2 | O | 7100 |
| Example 5 | 0.3 | O | 8500 |
| Example 6 | 0.2 | O | 8000 |
| Example 7 | 0.3 | O | 9200 |
| Comparative Example 1 | >9 | O | 8000 |
| Comparative Example 2 | >9 | O | 8000 |
| Comparative Example 3 | 2.6 | X | 8300 |

O: Stability was good; X: Separation of resin components was observed on the liquid surface

Examples 8–14, Comparative Examples 4–6

The components shown in Table 3 were introduced into a reaction vessel equipped with a stirrer. The mixture was stirred for 3 hours while controlling the temperature at 50–60° C. to prepare liquid curable resin compositions.

TABLE 3

|  | Example | | | | | | | Comparative Example | | |
|---|---|---|---|---|---|---|---|---|---|---|
|  | 8 | 9 | 10 | 11 | 12 | 13 | 14 | 4 | 5 | 6 |
| SA-1 | 1.0 | 0 | 0 | 0 | 0.5 | 1.0 | 0 | 0 | 0 | 0 |
| SA-2 | 0 | 1.0 | 0 | 0 | 0 | 1.0 | 0 | 0 | 0 | 0 |
| SA-3 | 0 | 0 | 3.0 | 0 | 0 | 0 | 0 | 0 | 0 | 0 |
| SA-4 | 0 | 0 | 0 | 1.0 | 1.0 | 0 | 0 | 0 | 0 | 0 |
| SA-5 | 0 | 0 | 0 | 0 | 0 | 0 | 3.0 | 0 | 0 | 0 |
| SB-1 | 0.1 | 0.2 | 0.5 | 0 | 0 | 0.1 | 0.5 | 0 | 0 | 0 |
| SB-2 | 0 | 0 | 0 | 0.2 | 0.2 | 0 | 0 | 0 | 0 | 0 |
| RA-1 | 0 | 0 | 0 | 0 | 0 | 0 | 0 | 0 | 0 | 5.0 |
| SC-1 | 0.1 | 0.1 | 0.2 | 0.1 | 0.1 | 1.0 | 0.5 | 0 | 3.0 | 0 |
| UA-2 | 97.3 | 95.7 | 93.3 | 97.2 | 96.7 | 95.4 | 94.5 | 98.5 | 94.0 | 93.5 |
| Photoinitiator (a) | 0 | 0 | 0 | 1.5 | 0 | 0 | 1.5 | 0 | 0 | 0 |
| Photoinitiator (b) | 1.5 | 0 | 0 | 0 | 1.5 | 1.5 | 0 | 1.5 | 0 | 1.5 |
| Photoinitiator (c) | 0 | 3.0 | 3.0 | 0 | 0 | 0 | 0 | 0 | 3.0 | 0 |
| Coating surface improver (d) | 0 | 3.0 | 3.0 | 0 | 0 | 0 | 0 | 0 | 3.0 | 0 |

Test Examples

The liquid curable resin compositions prepared above were cured to produce test specimens by the method described below. The test specimens were subjected to evaluation according to the following methods.

1. Preparation of test specimens.

A UV ink (Bestcure FRT™(blue) manufactured by T&K TOKA Co., Ltd.) was applied to glass plates using a spin-coater to produce a coating with a thickness of 20 mm, and irradiated with UV light at 0.1 J/cm$^2$ under nitrogen atmosphere. The liquid curable resin composition was then applied to this cured UV ink to a thickness of 50 mm and irradiated with UV light at 0.5 J/cm$^2$ under nitrogen atmosphere. The two-layer cured films were aged at 23° C. and 50% RH for over 12 hours. Only the cured layer of liquid curable resin composition on the glass plate was cut with a cutter knife to produce strips with a width of 1 cm.

2. Coating film removal test

To determine coating film removability, a T-peel test was carried out at a pulling rate of 50 mm/min and the adhesion strength of coating film on the test specimens was measured.

3. Measurement of shelf life

The shelf life was evaluated in the same manner as in Examples 1–7.

4. Measurement of water absorption

The liquid curable resin composition was applied to a glass plate using an applicator bar with a thickness of 250 μm and irradiated with UV light at 0.5 J/cm$^2$ under nitrogen atmosphereThe cured films were aged at 23° C. and 50% RH for over 12 hours, removed from the glass plate, and water absorption were measured according to JIS K7301.

5. Measurement of viscosity

The viscosity was evaluated in the same Examples 1–7.

6. Evaluation of coating film removability

Colored optical fibers with a diameter of 250 mm on which the above-described soft material, hard material, and UV ink (Bestcure FR™ (blue) manufactured by T&K TOKA Co., Ltd.) were applied and cured were prepared using an optical fiber drawing machine (manufactured by Yoshida Rogyo Co., Ltd.). The liquid curable resin composition of the present invention was applied to the optical fibers to produce a coated optical fiber with a diameter of 900 μm. The coated resin layer was cured by irradiation with UV light. The drawing the rate of optical fibers was 300 m/min and an UV lamp SMX 3.5 kw (manufactured by ORC manufacturing Co., Ltd.) was used as a UV light source. For the evaluation of coating film removability, the coated layer was removed using an optical fiber jacket remover as long as 5 cm from the end to observe discoloration (color removal) of colored optical fibers after the removal, by the naked eye. The results are shown in Table 4.

TABLE 4

|  | Adhesion strength (kg/cm$^2$) | Hygroscopic properties (%) | Shelf life of the liquid[1] | Coated film removability[2] | Viscosity (cps @ 25° C.) |
|---|---|---|---|---|---|
| Example 8 | 1.5 | 2.0 | ○ | ○ | 7900 |
| Example 9 | 1.5 | 1.9 | ○ | ○ | 7000 |
| Example 10 | 1.3 | 1.6 | ○ | ○ | 8500 |
| Example 11 | 1.4 | 1.7 | ○ | ○ | 7100 |
| Example 12 | 1.5 | 1.9 | ○ | ○ | 8500 |
| Example 13 | 1.4 | 1.8 | ○ | ○ | 8000 |
| Example 14 | 1.5 | 1.6 | ○ | ○ | 9200 |
| Comparative Example 4 | 5.0 | 3.2 | ○ | X | 8000 |
| Comparative Example 5 | 1.5 | 3.2 | X | ○ | 8100 |
| Comparative Example 6 | 1.5 | 3.0 | X | ○ | 8300 |

1) ○: Stability was good; X: Separation of resin components was observed on the liquid surface.
2) ○: Removability was good; X: Color removal from optical fibers was observed after coating layer removal As illustrated above, the liquid curable resin composition of the present invention exhibits superior shelf life in a liquid state and, after curing, has a slippery surface. The resin composition is therefore particularly suitable as a coating material for optical fibers, woods, plastic sheets, and the like. When used for the manufacture of optical fiber ribbons, this liquid curable resin composition does not require a lubricant such as silicone oil or talc.

The liquid curable resin composition of the present invention particularly suitable for upjacketing coatings, exhibits superior shelf life in a liquid state and, after curing, exhibits excellent coating film removability and anti-hygroscopic propertiesThe resin composition is therefore suitable not only as a coating material for optical fibers, but also as a coating material for woods, plastic sheets, and the like. This is an excellent material for improving an optical fiber splicing operationBoth liquid curable resin compositions can be expected to exhibit superior water repellency and anti-hygroscopic properties when used as a coating material for woods and plastics.

What is claimed is:

1. A liquid curable resin composition comprising: 0.05–10 wt % of a first polydimethylsiloxane having a molecular weight of 800–15,000 comprising:
   (a) at least two urethane bonds, an organic group unreactive to vinyl polymerisation attached to at least one end of the first polydimethylsiloxane, and a (meth) acryloyl group attached to at least one end of the first polydimethysiloxane, and
   (b) 0.05–2 wt % of a second polydimethylsiloxane having a molecular weight of 800–13,000 comprising: at least two urethane bonds, and an organic group unreactive to vinyl polymerisation and exclusive of a (meth) acryloyl group attached to at least one end of the second polydimethylsiloxane;
   (c) 0–90 wt % of a urethane (meth)acrylate oligomer; and
   (d) less than 80 wt % of a reactive diluent; wherein all said weight percentages are relative to the total composition.

2. The composition according to claim 1, wherein said composition further comprises 0.01–2 wt % of a third polysiloxane, which does not contain urethane bonds.

3. The composition according to claim 1, wherein the first polydimethylsiloxane has an average molecular weight of from 1000–7000.

4. The composition according to claim 1, wherein each terminal group of the second polydimethylsiloxane comprises an organic group unreactive to vinyl polymerization.

5. The composition according to claim 1, wherein the second polydimethylsiloxane has an average molecular weight of from 1500–5000.

6. The composition according to claim 2, wherein the third polysiloxane is present in the amount of from 0.01–2.0 wt. % relative to the total composition.

7. The composition according to claim 2, wherein the third polysiloxane comprises a copolymer of polydimethylsiloxane and at least one polyoxyalkylene.

8. The composition according to claim 1, wherein the composition further comprises a reactive diluent containing a vinyl group or a (meth)acryloyl group.

9. The composition according to claim 1, wherein the composition has a viscosity of 200–20,000 cps at 25° C.

10. A coated substrate comprising a coating formed from a composition according to claim 1.

11. The coated substrate of claim 10, wherein the coating has a Young's Modulus of 10–250 kg/mm$^2$.

12. The coated substrate of claim 10, wherein said coating displays a surface slip value of 0.1–1.5 kg/mm$^2$.

13. The coated substrate according to claim 10, wherein said composition displays an adhesion strength value of 1–10 g/cm.

14. The coated substrate according to claim 10, wherein the substrate is a coated and colored optical glass fiber.

15. The coated substrate of claim 14, wherein the coating is a matrix material, and the substrate is a plurality of coated and colored optical glass fibers.

16. The coated substrate of claim 14, wherein the coating is an upjacketing material.

17. The coated substrate according to claim 10, wherein the substrate is a plurality of optical glass fiber ribbons.

18. The composition of claim 1, wherein said composition comprises 20–70 wt % of said urethane (meth)acrylate.

19. The composition of claim 1, wherein said composition comprises 20–70 wt % of said reactive diluent.

* * * * *